United States Patent [19]

Williamson et al.

[11] Patent Number: 5,077,679

[45] Date of Patent: Dec. 31, 1991

[54] DOT PLACEMENT TECHNIQUE FOR SPEED OPTIMIZATION OF RASTER PRINTING DEVICES

[75] Inventors: Keith M. Williamson, Sunnyvale; Allen H. Downs, Redwood City; Riaz A. Moledina, Woodside, all of Calif.

[73] Assignee: Da Vinci Graphics, Inc., Sunnyvale, Calif.

[21] Appl. No.: 596,067

[22] Filed: Oct. 11, 1990

[51] Int. Cl.$^5$ .............................................. G06K 15/00
[52] U.S. Cl. ....................................... 395/105; 382/55
[58] Field of Search .................................. 364/518–521, 364/930 MS, 235 MS; 340/739; 382/47, 55; 101/93.04, 93.05, 93.03; 400/65, 121, 124, 126; 346/154

[56] References Cited

U.S. PATENT DOCUMENTS

| | | | |
|---|---|---|---|
| 4,809,345 | 2/1988 | Tabata et al. | 382/47 |
| 4,881,069 | 11/1989 | Kameda et al. | 382/47 |
| 5,016,195 | 5/1991 | Warp | 364/518 |

Primary Examiner—Arthur G. Evans
Attorney, Agent, or Firm—Fliesler, Dubb, Meyer & Lovejoy

[57] ABSTRACT

Method and abstract for preparing pen-stroke image information for print on a raster-type output device. The image is first vectorized according to a slope classification technique which designates dots of a vector for print in repeating patterns depending on the slope class of the vector, in a manner which optimizes print speed without loss of print quality. In a novel post-processing step, the print data is scanned along a print line and any dot which is designated for print at a dot position less than or equal to s/2 dot positions beyond the previous dot designated for print is eliminated, and any dot designated for print more than s/2 dot positions from the previous dot position by less than s dot positions beyond the previous dot position is moved to s dot positions beyond the previous dot position, where s is the maximum distance apart at which two dots can be printed without loss of quality.

4 Claims, 5 Drawing Sheets

DOT PLACEMENT TECHNIQUE FOR SPEED OPTIMIZATION OF RASTER PRINTING DEVICES

BACKGROUND OF THE INVENTION

1. Field of the Invention

The present invention relates to control systems for graphics output devices, and more particularly, a technique for preparing and printing pen-stroke image information on a raster-type output device.

2. History of the Prior Art

Serial printing mechanisms capable of producing random graphic and character images on a page have existed for some time in the form of dot matrix, ink jet, thermal and other printers. These devices typically operate by scanning a printhead or other print mechanism across a page while printing individual dots on the paper (or other printing medium), advancing the paper, then repeating the process. This process can also be accomplished by different sequences of motions of the printhead and the paper in combinations to produce stripes of image on the medium. The printhead may contain any number of printing elements, allowing multiple rows of dots (print lines), and/or sometimes multiple colors, to be printed in any single pass of the printhead. Some printers make multiple passes of the printhead in a single section of the paper, printing a single color in each pass.

These printing mechanisms are all speed constrained by printheads with limited printing frequency capabilities, typically on the order of 500-10,000 dots per second per printing element. Frequency constraints are the result of mechanical speed limitations or heat buildup (as in thermal and thermal ink jet), drop formation rates (ink jet), or other factors. As a result of these frequency constraints, these printers have typically limited their applications to those requiring only limited dot placement resolution on the printing medium.

Greater resolution using classical technologies would have a significant effect on throughput. To double the resolution would theoretically require twice as may dots to be printed per pass (to double the horizontal resolution) and would also require twice as many passes of the printhead to be made (to double the vertical resolution). The effect then would be to reduce throughput by a factor of four. Any increase in resolution by a factor of X would produce an X-squared reduction in throughput. To achieve truly high quality output using these technologies would have an unacceptable effect on throughput.

Graphics processors and vector-to-raster converters have typically taken the form of graphics information being input to the system and an array of dots being output to replicate the graphics input language as accurately as possible, given the resolution of the device. This is done without regard for the mechanical configuration or limitations of the mechanical device. That is, dots are placed at each point on the raster array which is closest to the desired vectors' positions.

To do this, the graphics processor must typically parse graphics language input (such as HPGL--Hewlett Packard Graphics Language) into a series of vectors. Complex commands such as characters, circles, etc. may result in multiple vectors being generated. Then, a vector-to-raster converter typically takes a resulting vector with endpoints x1, y1 and x2, y2. It converts this into an equivalent of the following form:

x1, y1
slope
length (in either x or y)
color (if the device produces color output)

Beginning at x1, y1, then, it increments y (or x) by one, adds the slope to x (or y), then finds the point on the output array closest to this result. The converter then repeats this process until it reaches the end of the vector and repeats the entire process for each vector to be printed. Only after converting all vectors for a given section of output can that output begin, since the last vector may begin at the first position to be printed.

Some converters perform this operation on the entire plot file before beginning to print. Others convert on the fly, performing these operations on only a band of output at a time (banded vector to raster converters). These converters sometimes use sorting and sections of vectors to improve their efficiency. None of these techniques, however, is designed to change the eventual placement of dots on the output medium. They are merely different methods of trading memory requirements with processing time.

Printhead control has also been done with little regard to the capabilities of the printhead. Although most printing mechanisms typically skip over large blank areas of output, when they print they virtually always do so at a single, preset speed consistent with the maximum dot placement density achievable for a preselected resolution (e.g. letter quality or draft). Again, they have not looked at how they may take advantage of processing or limit their speed constraints by treating the entire printing process as a system rather than a set of black boxes (vector to raster converter, motor control, print element drivers, printhead and print elements).

In U.S. patent application Ser. No. 319,659, filed Mar. 3, 1989, "High Quality Plotting Technique for Raster Printing Devices" by inventor Rick A. Warp, published as PCT International Publication No. WO 90/09889 on Sept. 7, 1990, both of which are incorporated herein by reference, there is disclosed a technique which ameliorates many of the above problems.

The novelty of the technique derives in part from a recognition of the relationship between dot size on the writing medium and addressable resolution. In general, the dot diameter most appropriate is larger than the distance between addressable points.

A series of these dots, placed in close proximity to one another can form a line. In fact, these dots do not have to be placed at each addressable point to fully define that line, although they should be placed with full addressable resolution to maintain the image quality expected of that resolution. FIG. 7 shows two dots 300 and 302 near each other in a row of dots. The distance designated A represents the "scalloping" effect on the line created by the distance between dots. As the dots get closer together, A decreases; as they get farther apart, A increases. Because the human eye has limits in its ability to resolve A, dots can be spread apart until A is just below the level at which the eye can see the scalloping of the line.

As long as no information is lost when dots are spread as described here, the addressable resolution integrity is maintained while limiting the number of dots that must be placed on the printing medium. To determine whether information has been lost in this spreading process, the only difference between a theoretically perfect line of width equal to the dot diameter should be the scalloping. Potential losses of information, if improperly implemented, would most often occur at the ends of vectors. Loss of information could also occur along a vector if the full resolution of the device is sacrificed in the spreading process.

For the purposes of this technique, the various output dot print lines which the output device will print are considered divided into a number of major print lines interleaved with one or more minor print lines. In the preferred embodiment, there are three evenly spaced minor print lines interleaved between each pair of major print lines. Each major print line and its three subjacent minor print lines therefore make up a group of four print lines. The configuration is chosen such that for a large percentage of vectors, printing only those dots of the vector which occur on a selected one of the print lines in each group will result in a printed vector having no less than a desired level of line quality.

Each vector is then converted to a series of dots chosen to concentrate them as much as possible on the major print lines. However, if the slope that the vector makes with the print line is smaller than a predetermined value, for example 45°, then additional dots are required to achieve the desired level of line definition. For these vectors, extra dots are placed as much as possible on a first one of the minor print lines, the center interleaving print line in the preferred embodiment.

For vectors with slopes smaller than a second angle to the print lines, smaller than the first angle, printing only two dots per group of print lines may still not provide enough line definition. For these vectors a dot is placed on one or more of the remaining print lines in each group, again according to an order of preference. If the system includes additional minor print lines, and additional dots are still needed for the desired level of line definition on a particular vector, dots are placed on these print lines also in an established order of preference.

Accordingly, dots of a vector are designated for print only according to an established order of preference, and only as necessary to achieve the desired level of line definition. If only one dot per group of print lines is required for line definition, it is preferentially placed on a first, predetermined one of the print lines in each group (i.e. the major print line). If a second dot in each group is required for line definition, it is preferentially placed on a second predetermined print line of each group (preferably a print line half way between each of pair of major print lines). If a third dot in each group of print lines is needed, it is preferentially placed on a third predetermined one of the print lines in each group, and if a fourth dot in each group of print lines is needed, it is preferentially placed on a fourth predetermined print line in each group. This procedure can continue to whatever number of print lines are available in each group.

Once the vectors have been converted in this manner to dot patterns, or, if banded vector-to-raster conversion is being performed, then once all the vectors in a band are converted, the dot patterns may be printed according to the technique on any of the standard output devices using a novel adaptive speed control method. In particular, as a dot line is being printed, the print mechanism slows down or speeds up in accordance with the density of dots which must be printed in an upcoming portion of the print line. Thus, since the dot patterns for printing have been concentrated onto the print lines in a preferential order, the print mechanism will typically have its lowest average speed when printing the first print line of a group, a substantially higher average speed when printing the second predetermined print line of each group, a still higher average speed when printing the third predetermined print line of each group, and so on.

Print mechanisms often print on a plurality of print lines on each pass. For example, the Fujitsu DL3400 24-pin printer prints dots on 24 print lines on each pass of the printhead. In this case the distance between major print lines is defined equal to the vertical distance between pins on the printhead. Thus in the preferred embodiment, where each group of print lines consists of four print lines, 24 major print lines are printed on one pass. The paper is then advanced by one print line, and the first one of the minor print lines in each of the 24 groups are printed on the next pass. The paper is then advanced by one more print line and the second of the minor print lines is printed in each of the 24 groups. The paper is then advanced by yet another print line and the third of the minor print lines is also printed for each of the 24 groups. Finally, the paper is advanced by 93 print lines and printing of the next 24 groups of print lines begins.

In this situation the adaptive speed control must take into account the dot density of all 24 of the grid lines which are being printed on any particular pass. Accordingly, the printhead is adaptively sped up or slowed down in accordance with the highest density in the upcoming portion of all the print lines which are being printed on a particular pass, instead of in accordance with the dot density in an upcoming portion of only one of the print lines. Whether the print mechanism prints one print line per pass or more, the technique described in the Warp application results in a substantial speed improvement for a given level of image quality.

In another aspect of that technique, the endpoints of many of the input vectors are slightly modified to line them up with major print lines. This process creates an absolute error in position, but it is not perceptible to the eye and does increase speed substantially. However, vectors shorter than a predetermined number of dots may be omitted from the endpoint modification process.

In yet another aspect of the technique, the bit map generated by the vector-to-raster conversion technique described above may be post-processed in order to eliminate redundant dots on the output. Redundant dots are those which may be omitted without violating the desired level of quality. For example, where a string of three dots (either horizontally, vertically or on an angle) are spaced such that the outer two dots are within the maximum permissible spacing for the desired level of quality (see FIG. 7), the center dot then adds no information to the plot. Such redundancies can be created where multiple vectors are spaced closely or cross in close proximity to one another.

Redundancy elimination can be implemented to different degrees, depending on trade-offs between computational speed/power versus print speed. For example, a one-dimensional approach can be taken in which redundancies are detected and eliminated only within each respective dot line; diagonal and vertical redundancies are ignored.

In a two-dimensional approach, as in the vector-to-raster conversion, elimination of redundancies is done in such a way as to minimize the number of dots which must be printed on the interleaving passes of the printhead. This is done by eliminating first all the redundant dots which occur on the least preferred one of the print lines in each group, then eliminating all the redundant dots which occur in the next least preferred one of the print lines in each group, and so on up the order preference until redundant dots are eliminated from the major print lines. This order of elimination serves to concentrate dots in the same print lines as does the vector-to-raster converter.

The Warp application describes two means, among others, to obtain higher resolution in the horizontal (printhead travel) axis without increasing the printhead frequency or reducing the printhead travel velocity beyond those levels employed by lower resolution devices:

1) When performing vector-to-raster conversion on near-horizontal (class 7) or horizontal (class 1) vectors, dots to be placed on the same print line (printed by the same pin) may be spaced as far apart as possible while maintaining acceptable perceived line quality. The maximum acceptable spacing may be determined by the diameter of the dots produced by the printhead. When this spacing is maintained for all print lines in a pass band (the collection of print lines printed by a single pass of the printhead), the band can be printed with the printhead travelling at its nominal velocity. For example, if all dots are spaced at a maximum horizontal spacing of 4/720", the nominal printhead velocity may be 6 inches per second (IPS).

2) A number of redundancy removal algorithms may be employed to remove visually redundant dots that arise from the close proximity of multiple vectors. In general, many of these algorithms cause the removal of dots that are within certain distances of dots to both the left and right on the same print line. The algorithms may be designed to produce the desired dot spacing for maximum printing speed. One of the possible algorithms described in the Warp application, for example, is designed to prevent any two immediately adjacent dots on a print line from both printing.

Unfortunately, situations frequently arise in which these algorithms are not able to maintain the desired dot spacing for all print lines in a print band. For example, in a printer with 1/720" dot placement resolution and 4/720" maximum dot spacing, it is still possible for horizontal dot spacings of 2/720" and 3/720" to occur. In these situations the printhead velocity must be reduced, for example to 3 IPS, in order to print at least a portion of the pass band, or the frequency limit of the printhead would be exceeded.

These less-than-desirable dot spacings appear to arise from two different causes. First, there is a high probability that a class 1 or 7 vector (defined below) will have its endpoint at a coordinate that is less than 4/720" from a previously rasterized dot on the same print line. Secondly, the intersection of two vectors at certain angles can easily create situations in which two dots, one from each vector, are less than 4/720" apart horizontally. Neither of these problems are addressed adequately in the Warp application. The post-processing and redundancy removal algorithms, except for the one which prevents two immediately adjacent dots from both printing, are ineffective since the offending dots are not bounded by dots on both sides.

The techniques disclosed in the Warp application are best used with graphics output devices. Print speed limitations are also a problem in serial character printers such as common dot matrix printers, where a set of restrictions are imposed upon the placement of dots within the stored bitmaps for the supported fonts. These restrictions are sometimes known as phase rules. In situations where the number of potential dot positions on a given print line is larger than the number of dots that can be printed without unacceptably reducing the printhead velocity, the phase rules incorporate knowledge of the frequency limit of the printhead and the desired printing speed in order to dictate which potential dot positions may be used in the bitmap for any given character. For example, a rule might specify that if a dot for any print line is placed in a bitmap at a horizontal position n, no dots may be placed on the same print line at positions n+1 and n+2.

However, this phase rule technology appears to consist merely of "rules of thumb" that are applied by human font designers. Control systems for the printers designed to print these fonts do not appear to perform any dynamic modification of the font data for the purposes of increasing print speed. In one known instance, a printer employs three separate font tables, each created using different phase rules, for each of the three available print speed/resolution settings.

Accordingly, the present invention applies to raster printing devices in which the addressable resolution and the dot diameter are such that dots are larger than the distance between addressable points. This allows continuous horizontal line segments to be printed using only a subset of the potential dot positions with the dots equally spaced at a distance of (r*s) where r is the distance between addressable points and s is a "preferred" integral spacing factor.

An objective of the present invention is to overcome the deficiencies of the previously discussed prior art, to allow all raster bands to be printed at a printhead velocity v=(f*r*s) (where f is the maximum frequency of an individual pin in dots per second). Specifically, the invention eliminates all nonoptimal dot spacing situations that would require all or part of a raster band to be printed at a velocity of v'=(f*r*x) where x is an integer less than s.

For example, in one prior art printer, f=1080 Hz., r=1/720" and s=4, resulting in a nominal printhead velocity of v=6 IPS. Using the Warp technique, the potential nonoptimal dot spacings of 2/720" and 3/720" are both handled using the worst case values of x=2 and v'=3 IPS. The present invention, by completely eliminating these frequently occurring cases, has been demonstrated to result in overall printing speed performance improvements of up to 30 percent, depending on the particular data being printed.

SUMMARY OF THE INVENTION

The present invention is an algorithm for removing and moving dots within a print line such that the desired dot spacing is achieved and such that dot positioning errors resulting from this dot manipulation are minimized. An implementation of this algorithm should be matched to the particular rasterization algorithm being used, in that the rasterization algorithm should attempt to generate horizontal dot spacings of s and the dot manipulation algorithm should enforce the same s value of dot spacing.

Given the "cooperation" between the rasterization and dot manipulation algorithms, the present invention will have effect only in those situations described above: at one endpoint of certain class 1 and 7 vectors, and near the intersection or close proximity of multiple vectors. If the rasterization of class 1 and 7 vectors always occurs left-to-right, potentially leaving nonoptimally spaced dots at the rightmost endpoint of the vectors, then the dot manipulation algorithm should also scan across a print line from left to right. If a dot is encountered that is less than or equal to (s/2) dot positions to the right of a previous dot, the dot on the right is removed. A dot that is more than (s/2) positions but less than s positions to the right of a previous dot is moved to the position that is s positions to the right of the previous dot.

As a result of this dot removal or movement, the rightmost end of class 1 and 7 vectors is effectively shortened or lengthened. The maximum amount a vector will be shortened is (floor(s/2)) dot positions and the maximum lengthening will be (ceil(s/2)−1). For the printer described above, these values are 2/720″ and 1/720″, respectively. Endpoint positions errors of this magnitude are acceptable, as they are generally not noticeable in typical plots.

In the case of two intersecting vectors, the positions of several dots in the rightmost vector may be modified near the point of intersection. However, since the modified dots overlap the dots of the leftmost vector, it is difficult to detect visually that any modification has occurred. The worst case scenario is two vertical vectors separated by a distance of (s/2), which due to the overlapping of dots would, were the algorithm not applied, appear to be a single "fat" line. Application of the algorithm effectively eliminates the entire rightmost vector, perceptibly reducing the width of the composite line. Fortunately, it is unlikely that such a situation would arise in practice, or that the perceived width of such a composite line would be critical to the quality of a plot.

The present invention can be applied dynamically to arbitrary vector-oriented data to increase the rendering speed of high resolution plots.

BRIEF DESCRIPTION OF THE DRAWINGS

The objects and the advantages of the present invention will become more apparent and more readily appreciated from the following detailed description taken in conjunction with the accompanying drawings, of which.

DETAILED DESCRIPTION

Figure 1:
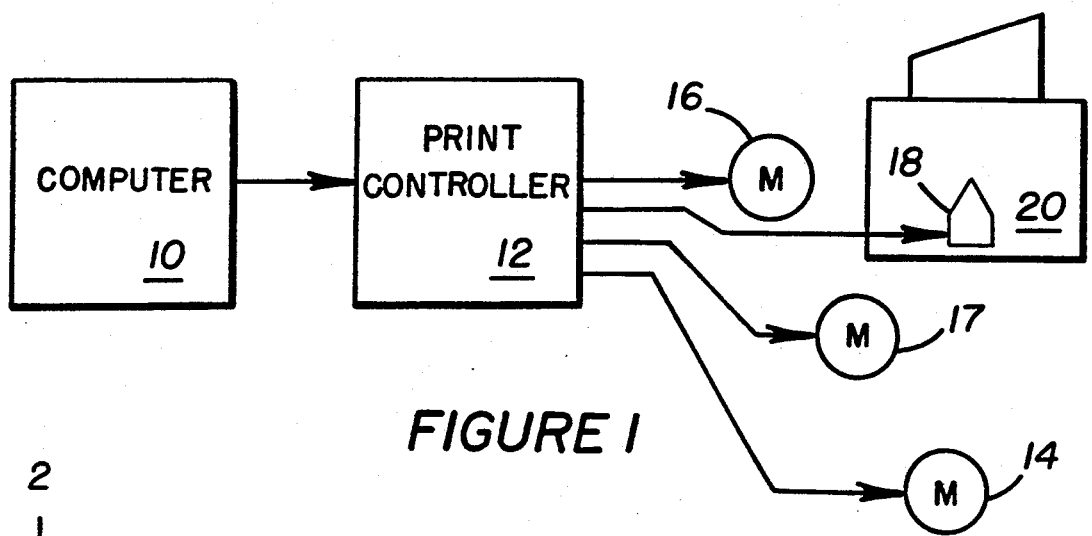
FIG. 1 shows the apparatus in which the invention may be used.

FIG. 1 shows a typical system organization in which the invention may be used. It comprises a computer 10, which provides graphics information to a printer controller 12, which in turn controls the carriage motor 14, the linefeed motor 16, the print elements on printhead 18, and the color motor 17 in a dot matrix printer 20. The computer 10 can be any computer, or any other source of graphics information. In the preferred embodiment the computer provides the graphics information in the form of Hewlett Packard Graphics Language ("HPGL") commands, but it will be understood that graphics information in any form would suffice. The print controller 12 converts the input graphics information into a set of input vectors, if the graphics information is not already in that form. It then converts the vector information to dot raster information in a manner described below, and outputs the resulting bit patterns to the printer 20.

The printer 20 is a standard 24-pin printer which has been specially modified to permit very high resolution dot placement. In particular, the printer 20 may be a Fujitsu DL3400 which has been modified to permit four times the normal dot placement resolution both horizontally and vertically. Since normal dot placement resolution for this printer is 180 dots per inch in each dimension, the modified printer permits an addressable resolution of 720×720 dots per inch. The modification may be accomplished by mechanically gearing down each of the motors 14 and 16, or, preferably, by direct electronic control of the motors 14 and 16. It is well known how to perform either of these modifications. For increased resolution in the horizontal dimension, as described in more detail below, no modification to motor 14 is necessary. Instead, increased resolution can be accomplished by appropriately timing the firing of the print pins as the carriage moves at a known velocity.

Overall System Flow

Figure 2:
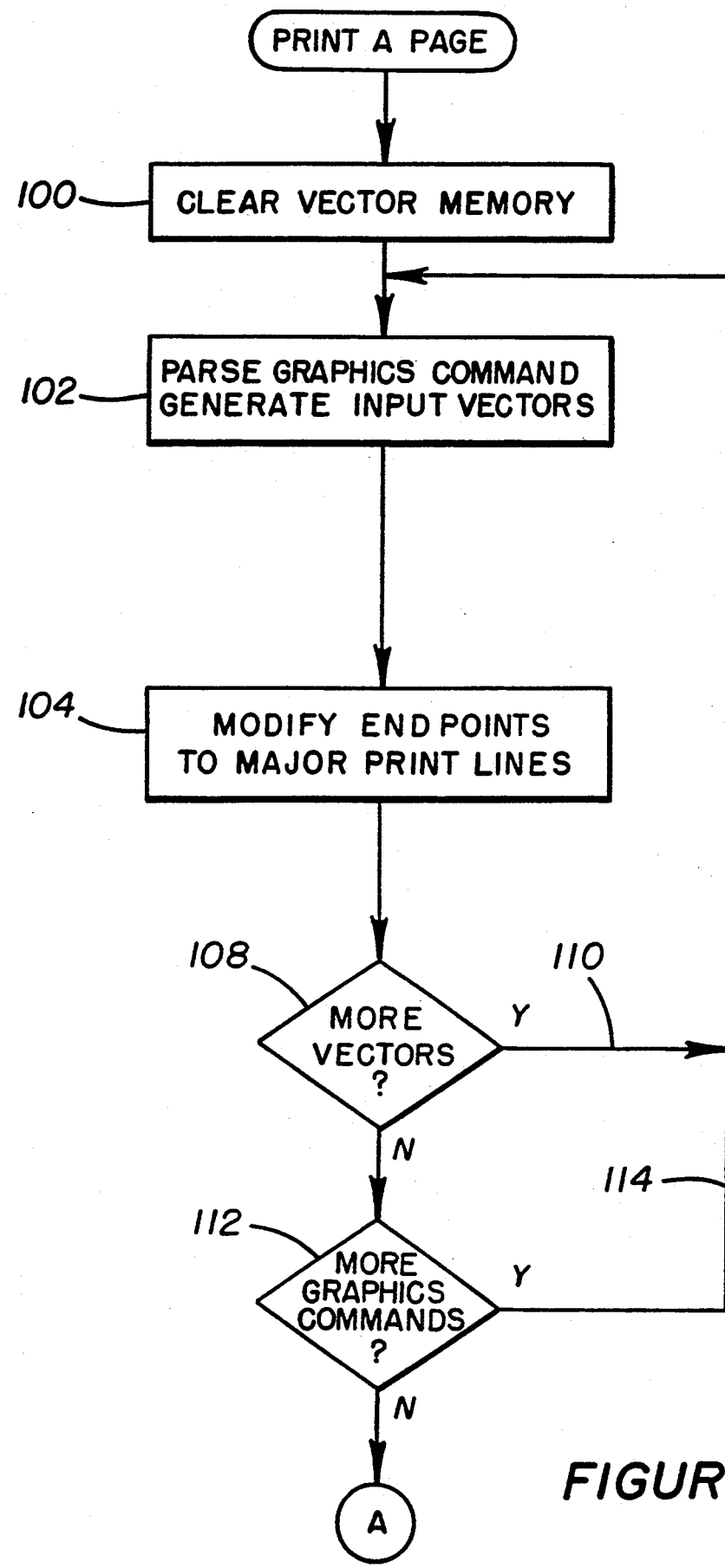
FIGS. 2-3 show a flowchart of a method according to the invention.
Figure 3:
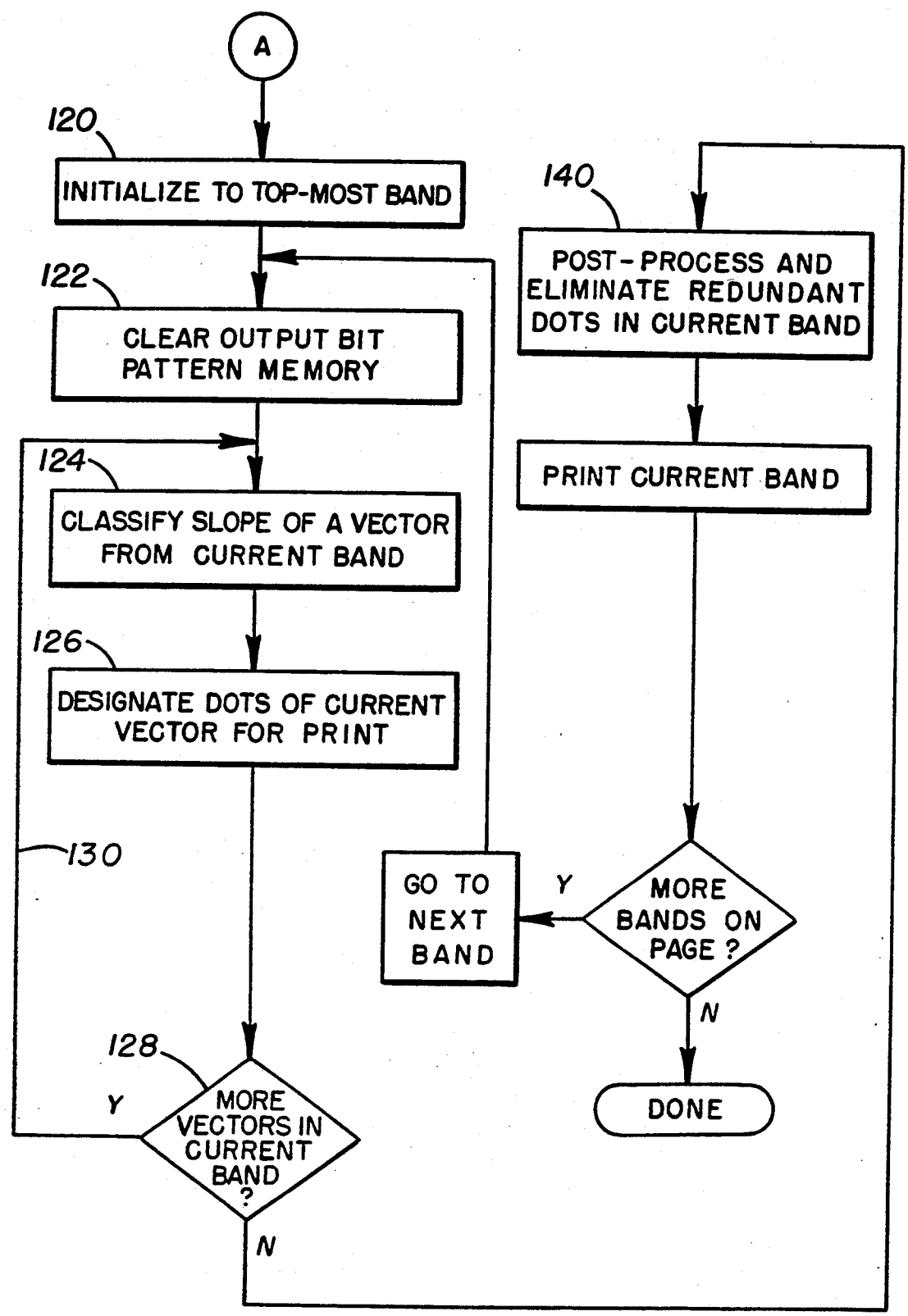

FIGS. 2 and 3 show an overall system flow chart for the preferred embodiment. The system performs banded vector-to-raster conversion, but it will be understood that appropriate modifications of the flow can be made in order to convert an entire page of graphics information to a dot pattern before any of it is printed. Banded vector-to-raster conversion requires far less memory than full page conversion, since memory is needed only for the vector descriptors and for one band worth of dots. However, banded vector-to-raster conversion can accommodate only a fixed, maximum number of vectors before exhausting memory, whereas a full page vector-to-raster converter can accommodate any number of vectors. In the preferred embodiment, however, in which dots are printed with an addressable resolution of 720 dots per inch, about 20 MB of memory would be required to perform full page vector-to-raster conversion for an 8½×11 inch page. It is therefore preferred, for this embodiment, to perform the conversion in a banded manner.

As explained in more detail below, in the preferred embodiment the printhead prints a set of 96 print lines in four passes (one major pass followed by three interleaving passes), before going on to the next set of 96 print lines. Thus, it is advantageous, though not necessary, that the bands be 96 print lines each. At 720 vertical dots per inch, that comes to about 0.13 vertical inches per band.

Referring to FIG. 2, when a page of graphics information is to be printed, the vector memory is first cleared in a step 100. In a step 102, input graphics command created by an external processing device, such as a computer, are parsed to generate the vectors which will be further processed in the inventive apparatus. In the preferred embodiment, the input graphics commands are accepted in HPGL, which is a well defined, often used language for communicating with pen plotter output devices. However, other input graphic forms can be used.

The parsing step 102 converts each HPGL command, or set of commands, into a plurality of "raw" straight line vectors. It is well known how to perform such a conversion. For example, a command to print a circle will result in a large number of straight line vectors at varying angles and with varying slopes. The same is true with a command to print a letter, such as the letter "S".

In the parsing step 102, various line widths are accomplished by combining two or more of the raw vectors internally to generate lines wider than the standard single dot width. These vectors are offset from each other by a fixed predetermined distance normal to the original vector. For example, to create a line that is two dots wide, the parsing step 102 may generate two vectors which are four dot positions apart and centered around and parallel to the nominal vector defined by the HPGL command, and in place of that nominal vector. Each of the two vectors' endpoints, then, will be about two dot positions from the nominal vector in a direction perpendicular to that nominal vector. Similarly, a 3-dot-wide line may be created by generating three vectors, each 4-dot positions apart in distance. One of the three vectors will be the same as the nominal vector defined by the HPGL command, and the other two vectors are each offset by four dot positions from the nominal vector in a direction perpendicular to that nominal vector.

Also, HPGL permits a choice of pens for any given vector. The preferred embodiment considers an HPGL pen number to indicate a print color and line width, and the color is generated using one or more of the four ribbon colors available on the printer. If the HPGL input command calls for a vector having a print color which must be generated using two or more of the ribbon colors, the parsing step 102 generates the appropriate number of vectors having identical position, size and slope, one for each of the ribbon colors which must be printed.

The parsing step 102 represents each raw vector in a format that includes the x and y coordinate positions of the uppermost endpoint of the vector, the length of the vector in the vertical dimension, the slope of the vector (in the form of the number of x coordinate positions which the vector traverses horizontally for a known traverse vertically), and ribbon color.

In an endpoint modification step 104, as each vector is generated, its endpoints are modified to line up both endpoints with major print lines. These print lines are defined as those in the eventual bit map corresponding to the major passes of the printhead (not the interleaving passes). In the preferred embodiment, major print passes occur for every fourth print line. Thus, endpoint modification is accomplished by first rounding the y positions of both endpoints of the vector to the nearest integer multiple of four print lines. If an endpoint of raw vector is exactly centered between two of these integer multiples of four print lines, then it does not matter which direction of modification is used. However, the direction chosen must be chosen consistently in order to make sure that different vectors meet up properly.

The endpoint modification step 104 creates an absolute error in the position of vectors, but this error is not perceptible to the eye and does increase speed substantially. However, for vectors shorter than a predetermined length, for example seven dots, the endpoint modification step is omitted because it would change the slope of the vector perceptibly. The predetermined length appropriate for a given embodiment of the invention may vary dramatically for different dot size and addressable resolution.

The endpoint modification step 104 may be performed either as part of the parsing step 102, in which the endpoints are modified even before the vector is stored, or it may be performed separately on each of the raw vectors after all the raw vectors are generated for a given graphics command or set of commands. The flow chart of FIG. 2 employs the former technique. In either case, the vectors as modified by the endpoint modification step 104 are sometimes referred to herein as "operating vectors". Also, if the endpoint modification step 104 is omitted for an embodiment of the invention, the operating vectors are the input vectors.

As indicated by testing step 108 and looping path 110, the endpoint modification step 104 is repeated for each of the vectors generated by the parsing step 102 in response to a given graphics command or set of graphics commands. Similarly, as indicated by testing step 112 and looping path 114, the entire process is repeated until all of the graphics commands for the page are processed. Because the preferred embodiment performs banded conversion, all the vectors for the page must be generated in this fashion before the conversion to raster begins.

The overall system flow chart beginning with FIG. 2 continues with the point marked "A" in FIG. 3. As mentioned, vectors are converted to dot patterns one band at a time. Accordingly, the system is initialized in a step 120 to convert the topmost band first. The output bit pattern for the band is then cleared in a step 122 in preparation for turning on specific dots to be designated in a vector-to-raster conversion step 126. The apparatus then enters a loop, as indicated by testing step 128 and looping path 130, to convert all the vectors in the band to bit patterns.

The conversion process takes place in two steps: a slope classification step 124, for classifying the vector into a number of slope classes as defined below, followed by a dot designation step 126, for designating the particular dots to be turned on. Preferably these two steps are pipelined, meaning while one vector is in dot designation step 126, the next vector is being classified in slope classification step 124. Also, preferably, the dot designation step 126 is performed by a custom gate array while the slope classification step 124 is performed in software.

Slope Classification

The slope classification assigned to the vector in step 124 will ultimately determine which dots of the vector will be designated for print. As previously explained, Applicant has recognized that not all the dots of a vector need be printed in order to achieve a desired level of quality. This is especially true where, as in the present embodiment, dots can be placed every 1/720 inches apart. In fact, there is a maximum dot placement distance which can be defined either empirically or mathematically, at which dots can be placed without compromising a desired level of image quality. Such maximum dot placement distance depends on factors such as the dot placement resolution available, the desired level of line definition, the dot placement accuracy, the diameter of each dot and the raggedness of its edges, among other things. For the purposes of the present embodiment, using the Fujitsu DL3400 printer Applicant has determined that dots can be placed about 0.008 inches apart without compromising image quality.

Though placing dots of a vector as far apart as possible is desirable, it will not necessarily result in the fastest plot. The printhead on a typical 24-pin printer will print all i'th ones of the print lines in each of the 24 groups corresponding to the elements on the printhead, in a single pass. The paper then advances by one print line, and the dots designated for print on the (i+1)'th print line of each of the 24 groups is printed on the next pass. However, if no dots are designated for print on a particular print line in any of the 24 groups, the printer need not make a pass at all for that print line. Also, even if a pass must be made, the printhead can move much more quickly if the dot density is lower.

Figure 4:
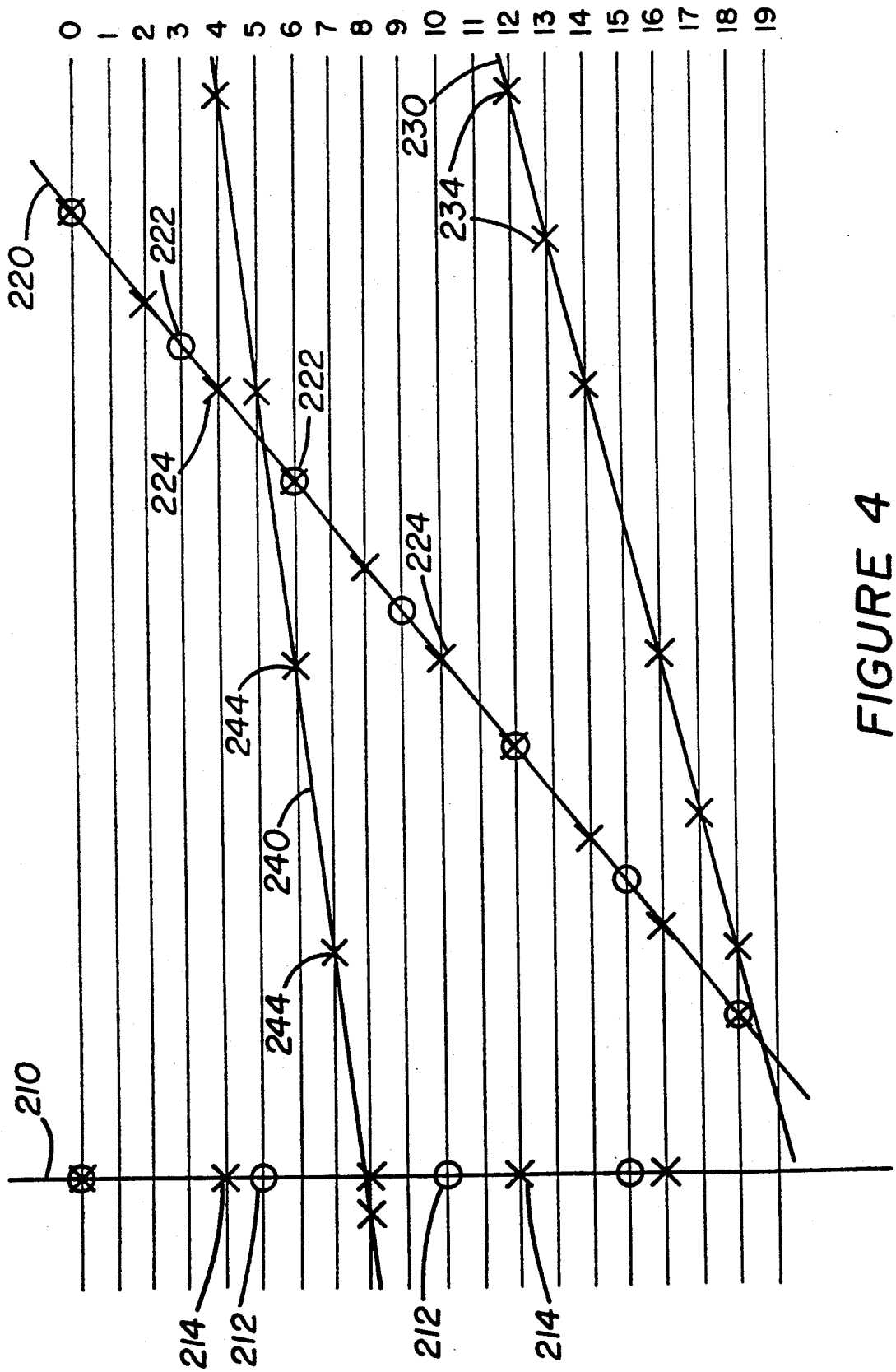
FIG. 4 is a diagram of printer output, useful for explaining the invention.
Figure 6:
FIG. 6 is a diagram useful for explaining the operation of a printhead.
Figure 7:
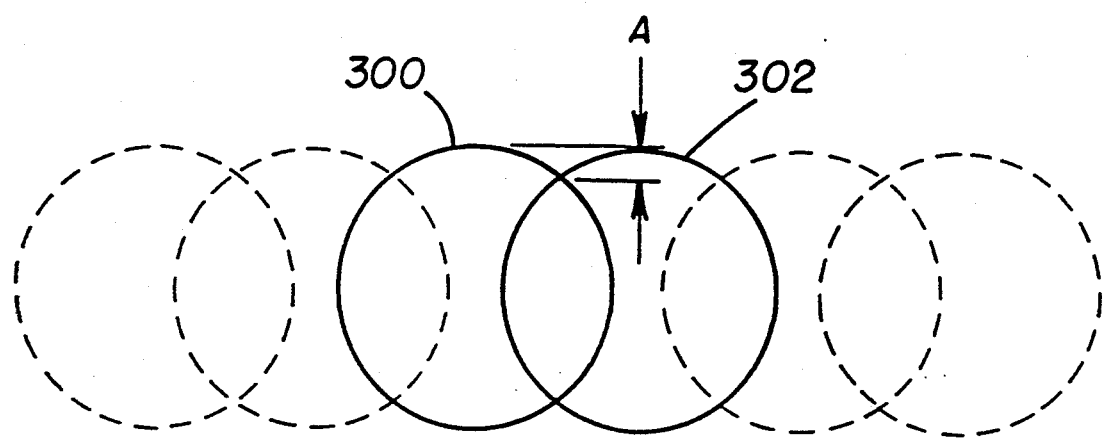
FIG. 7 is an enlarged representation of a row of printed dots.

FIG. 4 shows 20 print lines numbered 0 through 19. These print lines represent five major print lines bearing numbers 4i, i=0,1,2,3 and 4 together with the three minor print lines 4i+1, 4i+2 and 4i+3 subjacent each of the major print lines 4i. Each four print lines comprising a major print line 4i through minor print line 4i+3, represent a group of print lines as would be output by the printer. Vector 210, shown on FIG. 4, is a straight vertical vector which is to be drawn on the printer output. Since the dots can be placed as much as 8 mils apart, and since the print lines are only approximately 1.4 mils (1/720 inches) apart, this means that dots can be placed as far apart as every fifth print line without compromising image quality. Such dots are shown as circles 212 in FIG. 4.

However, instead of placing dots on every fifth print line for the vector 210, apparatus according to the invention concentrates the dots as much as possible in a preferential order of the print lines in each of the 35 groups. For the vertical line 210, dots are printed on every fourth print line, specifically the major print line in each group of print lines, instead of every fifth print line. These dots are shown as X's 214 in FIG. 4. If vector 210 is the only vector to be printed in the 24 groups, then it can be seen that the entire vector will be printed on the first (major) pass of the printhead. None of the interleaving passes will be necessary. If the vector 210 is not the only vector to be printed in the 24 groups of print lines, then at least this choice of dots does not add any dots to be printed on any of the less preferred interleaving print lines. Hence, the vector 210 is printed using more dots (one dot every 4/720 inches instead of one dot every 5/720 inches), at a much higher speed.

Vectors which are close but not exactly vertical can also be printed by placing dots on only major print lines. However, at some angle, dots placed only on the major print lines will be farther apart than the maximum spacing of 8 mils. Vector 220 in FIG. 4, for example, has a slope of about 40° to the print lines. Dots placed only on the major print lines would be spaced an absolute distance of about 8.9 mils from each other, larger than the maximum distance permitted by the desired level of quality. Dots can be placed on every third print line, as shown by circles 222 on vector 220, and this would satisfy the maximum dot placement requirement. However, as with the dots 212 on vector 210, printing every third dot on the vector would require the head to make four print passes to print it. Accordingly, dots are instead printed at every two print lines, as shown by X's 224 on vector 220. A vector with dots chosen in this way can be printed with only two passes of the printhead, and at higher image quality than if dots are placed on every third print line. Moreover, as shown in FIG. 4, the dots 224 which are selected for print are the first and third print line in each of the 24 groups of four print lines each. Thus the third print line in each group, which is also the second minor or interleaving print line, is the print line of the group which is preferred second to the major print line if dots must be placed more closely than one every major print line.

As the slope of a vector becomes smaller than a second angle to the print lines, it will be seen that even two dots per group of print lines will not keep the dots close enough together to satisfy the quality criteria. For vectors having a slope smaller than that second angle, three dots are printed in each group of print lines. These dots are chosen consistently in all groups as print lines 1, 2, and 3. These dots are shown as X's 234 on vector 230 in FIG. 4, which has a slope of about 15° to the print lines.

Similarly, for vectors having a slope smaller than yet a third angle, all four dots will be necessary to maintain print quality. Such dots are shown as X's 244 on vector 240, which has a slope of about 7.5°.

Finally, below yet a fourth slope angle, multiple dots on each of the four print lines are required to achieve the desired level of image quality.

It can be seen that dots of a vector are designated for print only in a particular order of preference of the print lines in each group, and they are designated with consistency for all vectors in all 24 groups. In the present embodiment the order of preference is as follows:

1. The first print line of each group of four print lines (the major print line);
2. The third print line of each group of four print lines (the second minor or interleaving print line);
3. The second print line of each group of four print liens (the first minor or interleaving print line); and
4. The fourth print line of each group of four print lines (the third minor or interleaved print line).

Dots of a vector are designated for print only in the above order of preference, only to the depth necessary to achieve the desired level of print quality. Dots will therefore be placed on the page with a heavy concentration on major print lines, a somewhat lighter concentration on the third print line of each group, a still lighter concentration on the second print line of each group, and the lightest concentration of all on the fourth print line of the group. Such an arrangement maximizes the chances that a particular print line will have no dots at all, and may therefore be skipped in the printing process, or that a particular print line can be traversed rapidly due to minimal dot density. Note that the print lines chosen for the third and fourth order of preference above may be interchanged in a different embodiment if desired. Printing on the first, second and third lines in a group is not different from printing on the first, third and fourth print lines in the group.

As previously set forth, the preferred embodiment implements the vector-to-raster conversion in a two step pipelined process. The first step, step 124 in FIG. 3, classifies the current vector according to its slope. For the purposes of handling vectors as described above, seven slope classes are defined as follows:

Class 1. Horizontal lines.
Class 2. Vertical lines.
Class 3. Lines between vertical and a first angle to the print line, for example 45°. These lines require no interleaving passes of the printhead.
Class 4. Lines having a slope between the first angle to the print line and a second angle to the print line, for example 20°. Lines in class 4 require one interleaving pass of the printhead.

Class 5. Lines between the second angle to the print lines and a third angle to the print lines, for example 10°. Lines in class 5 require two interleaving passes of the printhead.

Class 6. Lines between the third angle to the print lines and a fourth angle to the print lines, for example 5°. These lines will require all three interleaving passes of the printhead.

Class 7. Lines having a slope smaller than the fourth angle to the print line. These lines not only require all three interleaving passes of the printhead, but they also require printing multiple dots on each print line.

Figure 5:
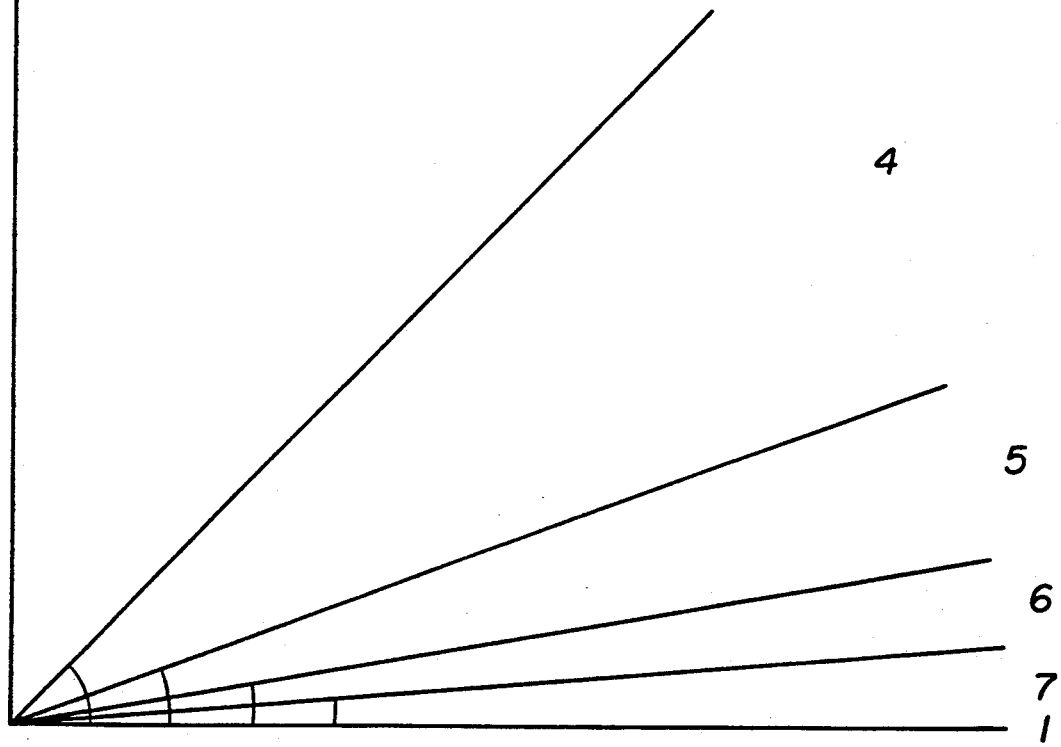
FIG. 5 is a slope classification diagram useful for explaining the invention.

These classifications are depicted in FIG. 5. The choice of the first, second, third and fourth angles for defining the slope classes will depend on the desired level of print quality and the geometries previously described.

The above slope classification scheme is most useful where each group of print lines consists of four print lines (one major print line and three interleaving print lines). In a different embodiment, another slope class could be added for each additional print line available in a group. Also, the use of seven slope classes is considered optimal in a four-print-line-per-group embodiment, but other numbers of slope classes may be used if desired. For example, class 5 may be merged into class 6, leaving only 6 classes. It is considered advantageous, however, if class 3, the vectors within which will be printed using only one dot per group of print lines, includes vectors having a slope equal to or greater than 45° to the print lines.

Dot Designation

After a slope class is assigned to a vector in step 124, dots of the vector are actually designated for print in step 126. This is a simple process of identifying the coordinate positions of the dots on the vector in the band, and designating for print only those which are to be printed for the vector's slope class. For vertical vectors in class 2, this involves designating for print every fourth dot from the highest y position that the vector attains in the band to the lowest, all at the specified horizontal position. Since the vector's upper endpoint and length have been appropriately modified in the endpoint modification step 104, all the dots designated for print will lie on major print lines. Also, for all classes, dots are printed at the full 1/720 inch addressable resolution in the horizontal dimension.

If the vector is in slope class 3, each dot, including the endpoints, will lie on major print lines as well. Only those dots will be designated for print.

If the vector is in slope class 4, every other dot, including the two endpoints of the vector, will be placed on major grid lines with full resolution in the horizontal dimension. Dots of the vector occurring on the third print line of each group of four, half way between the dots on major print lines, are also designated for print.

If the vector is in slope class 5, the first, second and third dots of each group of four dots are designated for print. Due to the endpoint modification step 104, the first of each group of four dots will lie on a major print line.

If the vector is in slope class 6, all dots of the vector are designated for print. The dots will begin and end on major print lines.

The dots of vectors in slope classes 2-6 may be identified using the simple algorithm of repeatedly incrementing the y position and adding vx to the x position, where vx indicates the slope as stored in the vector descriptor. For vectors in classes 1 and 7, which require multiple dots per scan line, it is preferable to reverse the independent and dependent axes for the conversion.

Post-Processing

After dots have been designated for print for all the vectors in the band, the entire band may be printed. However, the preferred embodiment according to the invention first removes certain dots previously designated for print, and moves other dots, in order to permit the maximum possible print speed.

Post-processing may be implemented either in hardware or software, but the preferred method would be to incorporate the algorithm into the custom IC that performs rasterization and post-processing. However, a software approach may also be used. The following software routine (in C) is applied to the columns of raster band data as they are retrieved from the rasterizer IC:

```
x = 0;                                              /* column index counter */
data_p1 = 0;                                        /* raster data for column n+1 */
data_m1 = 0;                                        /* raster data for column n-1 */
data_m2 = 0;                                        /* raster data for column n-2 */
data_m3 = 0;                                        /* raster data for column n-3 */
do {                                                /* loop for each column across media */
    get(data);                                      /* get data for current column */
    data = data | data_p1;                          /* move dots by ORing data from last loop iteration */
    data_p1 = data & data_m3;                       /* prepare to move dot if dot three back is set */
    data = data & |(data_m1 | data_m2 | data_m3);   /* remove dot if any of three previous dots is set */
    data_m3 = data_m2;                              /* shift data to prepare for next iteration */
    data_m2 = data_m1;
    data_m1 = data;
    store(data);                                    /* store modified column data */
} while (++x < WIDTH);                              /* increment index and check if done */
```

It can be seen that the above routine eliminates any dot which follows the previous dot on the print line by one or two dot positions, and moves any dot which follows the previous dot by three dot positions to the fourth dot position following the previous dot. Accordingly, no dots will need to be printed at less than a 4-dot position spacing, thereby permitting the highest print head velocity of 6 IPS to be used in all cases.

The above software implementation is appropriate for the above-described printer, in which r=1/720" and s=4, and it will be understood that other implementations will be more appropriate for other printers. Additionally, it will be understood that the functions of the invention may be merged with other steps in the system flow; for example, for class 1 and 7 vectors, the last endpoint generated may simply not be generated if it would be located less than or equal to s/2 dot positions beyond the previous dot generated, and may be moved to the s'th dot position beyond the previous dot generated if it would otherwise be located between s/2 and s dot positions beyond the previous dot generated.

Where the bit pattern to print is a multi-color bit pattern, in which any dot can be designated for print in two or more different colors on respective different print passes, the post-processing step should scan the data in the same direction for all colors. This prevents certain problems such as color aliasing.

Also, in the present embodiment, data is scanned and modified for a raster band just before the printhead begins to print it. It might be possible to devise an embodiment that processes the data while it is being printed, but bidirectional printing would result in the data being scanned for post-processing, half the time, in a direction different from that of the rasterization algorithm.

The invention has been described with respect to particular exemplary embodiments thereof, and those skilled in the art will readily appreciate that many modifications are possible without materially departing from the novel teachings and advantages of this invention. For example, in one variation of the invention, the post-processing step can be modified to eliminate the dots which would otherwise be moved. Such a modified system would have the same performance benefits at the cost of a slightly higher endpoint positioning error. In another variation, the post-processing step can be modified to move all dots placed less than s dot positions beyond the previous dot designated for print, to the s'th dot position beyond the previous dot designated for print. In general, the post-processing step should eliminate all dots designated for print less than t dot positions beyond the previous dot designated for print, and should move to the s'th dot beyond the previous dot designated for print all dots designated for print greater than or equal to t dot positions beyond the previous dot designated for print but less than s dot positions beyond the previous dot designated for print, where t is a predetermined number between 1 and s, inclusive.

We claim:

1. A method for preparing a dot pattern for print with improved print speed on a plurality of print lines, comprising the steps of:

providing a pattern of dots designated for print;

eliminating from said pattern each n'th one of said dots designated for print if the $(n-1)$'th one of the dots designated for print on the same print line is less than t dot positions away; and moving each m'th dot designated for print, which m'th dot is greater than or equal to t but less than s dot positions from the $(m-1)$'th dot designated for print on the same print line, to the s'th dot position beyond the $(m-1)$'th dot designated for print, where s is the maximum number of dot positions apart at which two dots can be printed without violating a predetermined level of quality, and where t is a predetermined integer between 1 and s inclusive.

2. A method according to claim 1, wherein $t=1$.
3. A method according to claim 1, wherein $t=s$.
4. A method according to claim 1, wherein $t=s/2+1$.

* * * * *